United States Patent [19]

Sarkoezi

[11] Patent Number: 4,955,040

[45] Date of Patent: Sep. 4, 1990

[54] METHOD AND APPARATUS FOR GENERATING A CORRECTION SIGNAL IN A DIGITAL CLOCK RECOVERY DEVICE

[75] Inventor: Imre Sarkoezi, Munich, Fed. Rep. of Germany

[73] Assignee: Siemens Aktiengesellschaft, Berlin and Munich, Fed. Rep. of Germany

[21] Appl. No.: 257,559

[22] Filed: Oct. 14, 1988

[30] Foreign Application Priority Data

Oct. 27, 1987 [DE] Fed. Rep. of Germany ....... 3736351

[51] Int. Cl.$^5$ ............................................. H03D 3/24
[52] U.S. Cl. ................... 375/119; 307/262; 328/155
[58] Field of Search ............... 375/118, 119; 328/155; 307/262; 331/45

[56] References Cited

U.S. PATENT DOCUMENTS

| 3,582,789 | 1/1969 | Mick | 375/110 |
|---|---|---|---|
| 4,320,515 | 3/1982 | Burton, Jr. | 375/120 |
| 4,348,762 | 9/1982 | Shiun et al. | 371/47 |
| 4,400,667 | 8/1983 | Belkin | 375/120 |
| 4,573,173 | 2/1986 | Yoshida | 375/118 |
| 4,672,639 | 6/1987 | Tanabe et al. | 375/118 |
| 4,780,889 | 10/1988 | Ley et al. | 375/106 |

FOREIGN PATENT DOCUMENTS

| 2641547 | 3/1978 | Fed. Rep. of Germany . |
|---|---|---|
| 2230129 | 5/1974 | France . |
| 8301625 | 3/1984 | Netherlands . |
| 1421966 | 3/1974 | United Kingdom . |

OTHER PUBLICATIONS

"IBM Technical Disclosure Bulletin", vol. 29, No. 2, Jul. 1986, pp. 903-904.

Primary Examiner—Benedict V. Safourek
Assistant Examiner—Tesfaldet Bocure

[57] ABSTRACT

A digital clock recovery system according to the prior art contains a phase sensor with a delay device. This cannot be implemented with the required accuracy in integrated circuit technology. The invention does not required any delay device for its implementation. A phase sensor (6) does not compare the phase relationship of the active edges of the pulses of a digital signal (DS) with a first auxiliary data clock (DHT1) which acts as clock recovered from the digital signal (DS), but instead, at phase sensor (6) compares the phase relationship of the active edges of the pulses of the digital signal (DS) and a second auxiliary data clock (DHT2) which has a defined phase difference relative to the first auxiliary data clock (DHT1). If the comparison does not result in a phase difference, a correction signal (K) is generated which causes a phase correction of both of the auxiliary data clocks (DHT1, DHT2) which produce the defined phase difference. Digital clock recovery devices are used in digital signal multiplexing devices and distributor multiplexors between, in particular, higher levels of a digital signal hierarchy.

10 Claims, 6 Drawing Sheets

FIG 11b  DHT2

FIG 11c  K*

FIG 11d  DHT1

FIG 11e  K

FIG 12

METHOD AND APPARATUS FOR GENERATING A CORRECTION SIGNAL IN A DIGITAL CLOCK RECOVERY DEVICE

CROSS REFERENCES TO RELATED APPLICATIONS

This application is related to copending application entitled Method and Apparatus For Extracting An Auxiliary Data Clock From the Clock and/are the Clock Phase or Synchronous or Plesichron Digital Signal, in which the inventor is Wilhelm Volejnik, Ser. No. 116,663 assigned to the assignee of the present application.

BACKGROUND OF THE INVENTION

This invention relates to a method and apparatus for generating a correction signal when a defined phase interval exists between a digital signal and a first auxiliary data clock, which represents a selection, which changes with the phase interval of one of several auxiliary clocks which have equal phase intervals with respect to each other.

DESCRIPTION OF RELATED ART

The prior art discloses a system in which auxiliary clocks, which are shifted in phase equal amounts with respect to each other and which have the same frequency are generated and differs slightly from the nominal clock frequency of the digital signal. The auxiliary clocks are supplied to a phase correction device which emits one of them as the recovered clock of the digital signal which is designated the auxiliary data clock. A phase sensor measures the time interval between the edges, which are selected as the active edges, of the digital signal and the auxiliary data clock and, if this interval falls below a de minimum interval, causes a phase correction in the phase correction device by using the correction signal, in a manner such that the measurable interval increases above the defined minimum value. Except for a crystal oscillator, this arrangement can be implemented in an integrated circuit. The crystal oscillator can also feed several such integrated circuits.

The phase sensor according to the prior art, which generates the correction signal, contains a delay device which cannot be easily in integrated circuit technology with the required accuracy for its delay time.

See also U.S. Pat. No. 3,582,789, British Patent No. 1,421,966, Dutch No. 8,301,625, German No. 2,641,547, French 2,230,129 and IBM Technical Disclosure Bulletin Vol. 29 No. 2 July 1986.

SUMMARY OF THE INVENTION

It is an object of the invention to provide for generating a correction signal with an integrated circuit.

The object of the invention is to use a second auxiliary data clock having the same frequency as the first auxiliary data clock which is shifted in phase a fraction n/m of the period of the first auxiliary data clock relative to the first clock and the phase interval between active edges of the pulses of the digital signal and the second auxiliary data clock is measured (n=integral number, n<m) and is the correction signal and is produced as an output if no phase interval is detected.

It is advantageous in the invention if one of the auxiliary clocks is used as the second auxiliary data clock.

It is also advantageous if an even number m of auxiliary clocks are used and if an auxiliary clock which is shifted in phase by 0.5 UI (Unit Interval) with respect to the first auxiliary data clock, is selected as the second auxiliary data clock.

A phase sensor for carrying out the method according to the invention is formed with a first D-type flipflop. The D input of the flipflop is the input for the digital signal and the clock input is the input for the second auxiliary data clock. A device for generating the correction signal synchronously with the first auxiliary data clock is provided. The first input of the device for generating the correction signal is connected to the Q output and the inhibit signal output is connected to the reset input of a first D-type flipflop and the second input is the input for the first auxiliary data clock and the output is used as the output for the correction signal.

It is advantageous if the device for generating the correction signal consists of a second D-type flipflop which has its D input connected to the Q output of the first D-type flipflop and its clock input connected to the input for the first auxiliary data clock and the Q output is used as the output for the correction signal. An AND gate has its first input connected to the $\bar{Q}$ output of the second D-type flipflop. The second input of the AND gate is connected to the reset input of the second D-type flipflop and to an input for a setting signal and the output of the AND gate is connected to the reset input of the first D-type flipflop.

If the first auxiliary data clock in the phase correction device is selected from the auxiliary clocks with a first change-over switch, it is advantageous if a second change-over switch is coupled to the first change-over switch which selects as the second auxiliary data clock the auxiliary clock which has a required specified phase interval with respect to the first auxiliary data clock.

Both of the change-over switches can be constructed as electronic change-over switches. Such change-over switches can be constructed in a manner such that for each auxiliary clock, a D-type flipflop having a test input and a test enable input is provided. The clock input is connected through an inverter to the input for the auxiliary clock. The Q output is connected to the D input. The TE input is connected to the input for the synchronous correction signal and the TI input is connected to a control device. A further AND gate is provided for each auxiliary clock which has a first input which is connected to the $\bar{Q}$ output of the D-type flipflop which has a test input and a test enable input, and the second input of the further AND gate is connected to the input for the auxiliary clock. An OR gate is provided which has inputs which are connected to the outputs of the further AND gates and the output is the output for the auxiliary data clock. The method and apparatus of the invention can be implemented in integrated circuit technology and can be used, in particular, for bit rates equal to or greater than 34 Mbit/s.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIGS. 13a-13g illustrate pulse timing diagrams for the correction signal generator according to FIG. 12.

DESCRIPTION OF THE PREFERRED EMBODIMENTS

Figure 1:
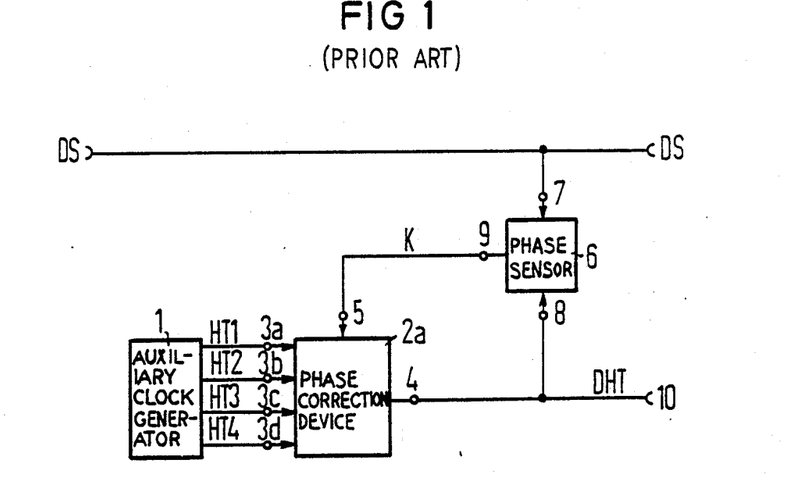
FIG. 1 shows a block diagram of a clock recovery device according to the prior art.

FIG. 1 shows a prior art clock recovery device for generating an auxiliary data clock DHT for a digital signal DS. The arrangement contains an auxiliary clock generator 1 which feeds a phase correction device 2a which is connected to receive an input from and to supply an output to a phase sensor 6.

From the auxiliary clock generator 1, auxiliary clock signals HT1-HT4, which have the same frequency but which have phase differences of 0.25 UI (Unit Interval) relative to each other, are applied to inputs 3a-3d of the phase correction device 2a. The auxiliary clock signals HT1-HT4 have frequencies which are either slightly lower or slightly higher than the bit rate of the digital signal DS. The phase sensor 6 determines how the selected active edges of the digital signal DS and the auxiliary data clock DHT shift relative to each other and when a predetermined phase interval is reached, the phase sensor 6 produces a correction signal K output at terminal 9 which is supplied to the phase correction device 2a terminal 5 which causes the phase correction device to switch the next one of the auxiliary clock signals HT1-HT4 to its output 4 as the auxiliary data clock DHT.

Figure 2:
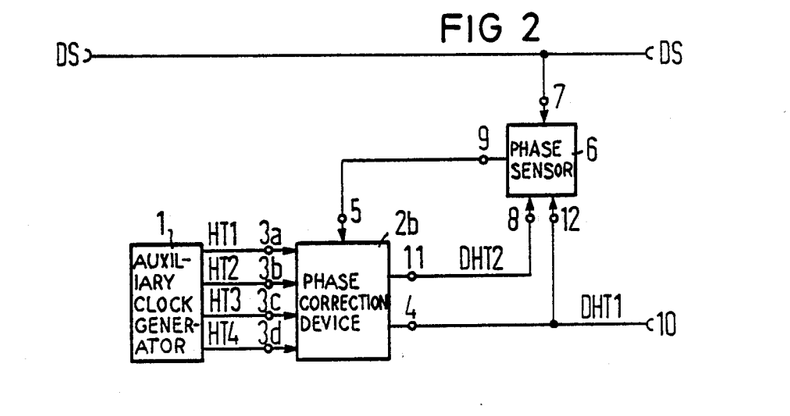
FIG. 2 shows a block diagram of the clock recovery device according to the invention.

FIG. 2 shows the block diagram of a clock recovery device according to the invention. This circuit differs from the prior art device of FIG. 1 in that the phase sensor 6 is supplied not only with a single auxiliary data clock signal DHT as in the prior art, and receives a first auxiliary data clock signal DHT1 and also a second auxiliary data clock signal DHT2 from the phase correction device 2a, which has been shifted in phase by a predetermined amount relative to the clock signal DHT1. These signals are selected and supplied by the phase correction device 2b. The phase sensor 6 does not require a delay section as is required in the prior art sensor, because the correction signal K is produced when the active edges of the digital signal DS and the auxiliary data clock DHT2 have the same phase relationship.

Figure 3:
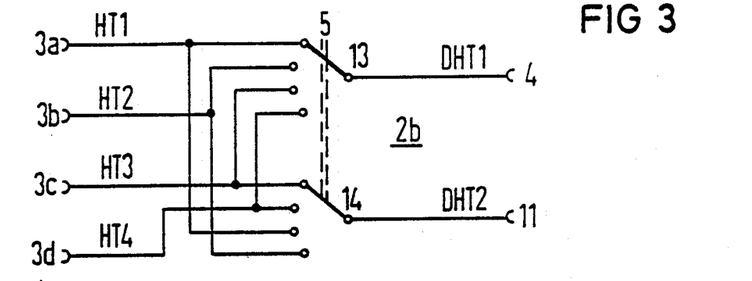
FIG. 3 shows a phase correction device.

FIG. 3 shows a phase correction device 2b with changeover switches 13 and 14. The switches 13 and 14 each have four positions to select HT1, HT2, HT3 and HT4 as shown and the phase relationship of the first auxiliary data clock DHT1 differs by 0.5 UI from the phase relationship of the second auxiliary data clock DHT2 in each switching position. The correction signal K controls the position of switches 13 and 14.

Figure 4:
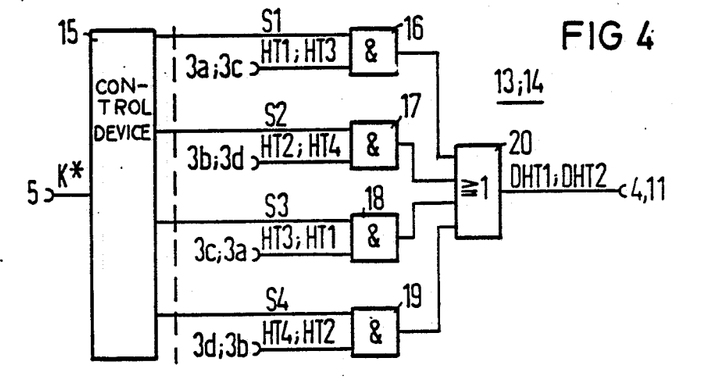
FIG. 4 shows a first electronic change-over switch.
Figure 5A:
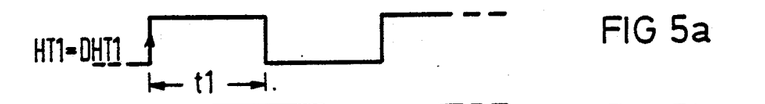
FIGS. 5a-5d illustrate pulse timing diagrams for the change-over switch according to FIG. 4.
Figures 5B, 5C, 5D:
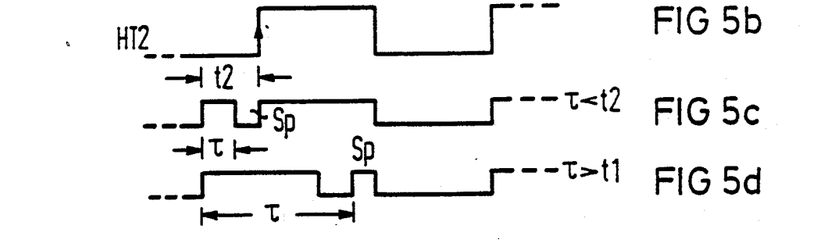

FIG. 4 shows a control device 15 and electronic changeover switches 16 to 20. This structure can replace the mechanical change-over switch 13 or the mechanical change-over switch 14 shown in FIG. 3.

The control device 15 outputs four control bits S1 through S4. These form a codeword having one logical "H" state and three logical "L" states. If a pulse of the asynchronous correction signal K* occurs at input 5, the logical "H" state is shifted on and a new codeword is produced. Since this correction signal K* from the auxiliary data clock DHT2 is enabled after a propagation time through the control device 15 and the phase sensor 6, an asynchronous switch-over is produced.

FIGS. 5a-5d show a switch-over from the auxiliary clock HT1, which acts as the auxiliary data clock DHT1, to the auxiliary clock HT2. If the propagation time $\tau$ is shorter than the period t1 but longer than the period t2, the switch-over occurs without problems because the pulses which are to be switched overlap. If this is not the case, spikes Sp are produced which can cause disturbances. It is therefore desirable to operate with a synchronous correction signal K.

Figure 6:
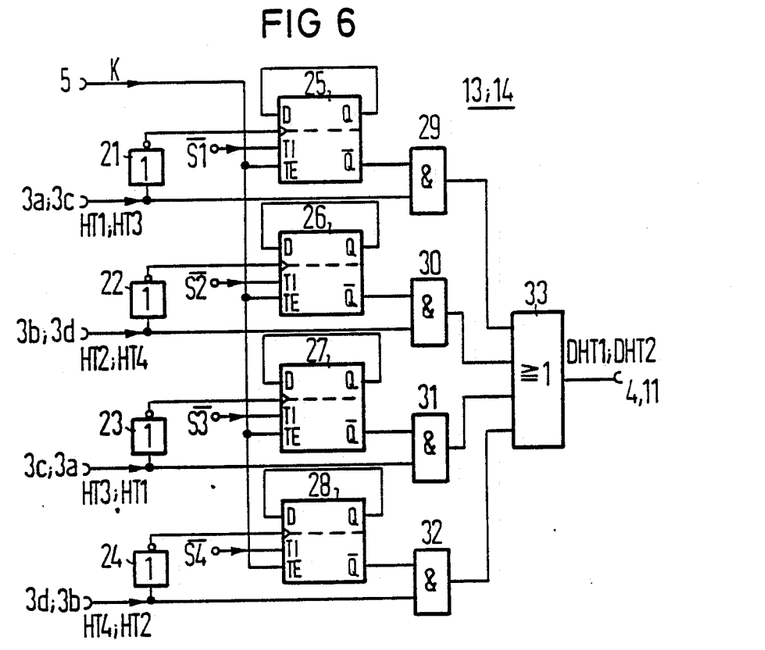
FIG. 6 shows a second electronic change-over switch.

FIG. 6 shows an electronic change-over switch which can replace the change-over switches 13 and 14 shown in FIG. 3 and which operates with a synchronous correction signal K. The change-over switch contains inverters 21 to 24, D-type flipflops 25 to 28 with additional test inputs, AND gates 29 to 32 and an OR gate 33 connected as shown.

Figure 7:
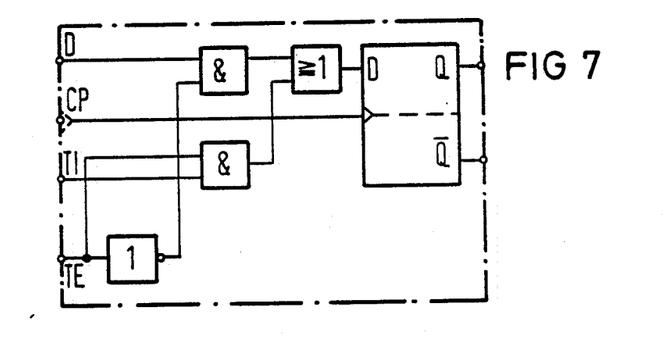
FIG. 7 shows a D-type flipflop with test inputs.
Figure 8A:
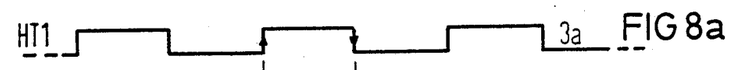
FIGS. 8a-8f illustrate pulse timing diagrams for the change-over switch according to FIG. 6, FIGS. 9a-9g illustrate further pulse timing diagrams.
Figure 8B:
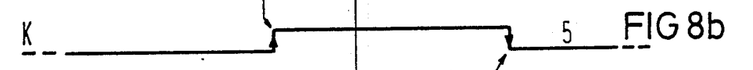
Figure 8C:
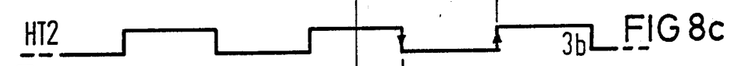
Figure 8D:
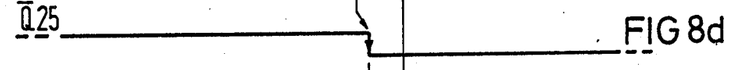
Figure 8E:
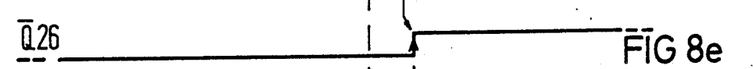
Figure 8F:
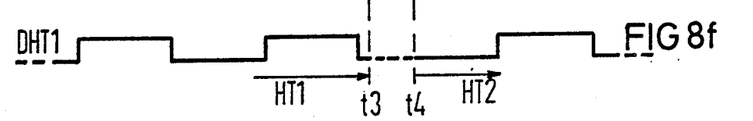
Figures 9A, 9B:
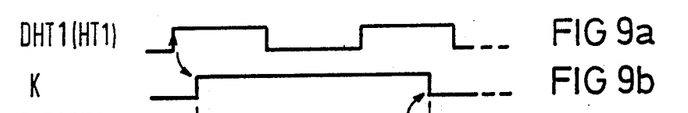
Figure 9C:
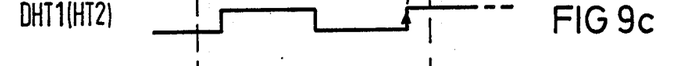
Figure 9D:
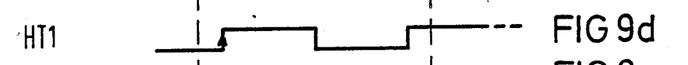
Figure 9E:
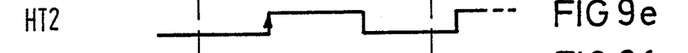
Figure 9F:
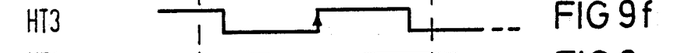
Figure 9G:
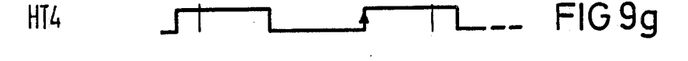

The D-type flipflops 25 through 28 are commercially available and are connected as shown in FIG. 7. If a logical "L" state is present at the test enable input TE, the D-type flipflops 25 through 28 operate like normal D-type flipflops. If, in contrast, the state at the test enable input TE is a logical "H", switching occurs from the D-type input to the test input TI.

As long as the correction signal K at input 5 has a logical "L" state, the D inputs of the D-type flipflop 25 through 28 are active. These flipflops are by means of the auxiliary clock signals HT1 to HT4 through the inverters 21 to 24 clocked, of which the output states are repeatedly read in. A change in the state of the inverted control bits $\overline{S1}$ through $\overline{S4}$ at the test input TI is acted on only when there is a change in the correction signal K to the logical "H" state by switching the D inputs of the D-type flipflops 25 through 28 over to the test inputs TI. It is shifted in accordance with the phase difference between, for example, the adjacent phases of the auxiliary clocks HT1 and HT2 and read in synchronously with the phase of these signals. The states which are read in are forwarded with the phases which are half a period later through the AND gates 29 through 32.

FIGS. 8a-8f illustrate a switch-over from the auxiliary clock HT1 to the auxiliary clock HT2 on transition of the correction signal K from the logical "L" state to the logical "H" state. The auxiliary clock HT1 switches itself off by its negative edge with the $\overline{Q}$ output of the D-type flipflop 25 ($\overline{Q}25$). The auxiliary lock HT2 switches itself on with its negative edge with the $\overline{Q}$ output of the D-type flipflop 26 ($\overline{Q}26$). The state of the auxiliary data clock DHT1 is continuously a logical "L" during the period between such switch-off and switch on during t3 to t4. This results in a spikeless transition. The time of half a period (0.5 UI) is in each case available for switch off and switch on so that the implementation of the change-over switch in integrated HCMOS technology does not result in any problems even with a bit rate of 34 Mbit/s.

FIGS. 9a–9g illustrate pulse timing diagrams for an auxiliary data clock DHT1 which was the auxiliary clock HT1 before switch-over and which became the auxiliary clock HT2 after the switch-over which was enabled by the correction signal K. If the correction signal K is synchronous with the auxiliary data clock DHT1, it is always assured that all of the control bits $\overline{S1}$ through $\overline{S4}$ can be read in since the pulse duration of the correction signal K is independent of the propagation time. Due to propagation delay the auxiliary data clock DHT1(HTx) is delayed with respect to the auxiliary clock (HT).

Figure 10:
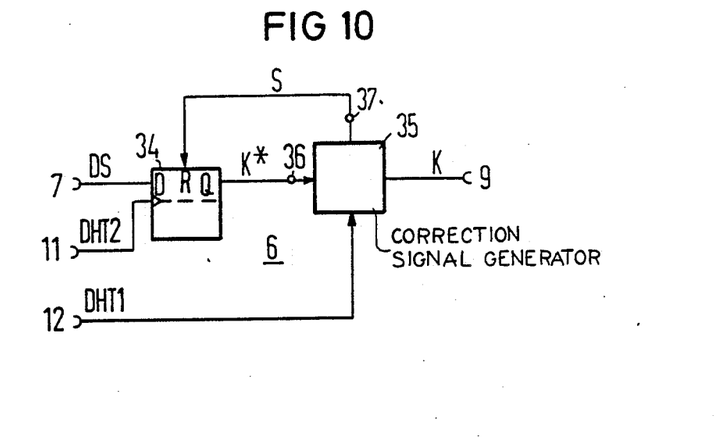
FIG. 10 shows the block diagram of a phase sensor.

FIG. 10 shows a phase sensor 6 with a D-type flipflop 34 at the input and a subsequent device 35 for generating the correction signal K which is synchronous with the first auxiliary data clock DHT1 connected as shown.

Figure 11A:
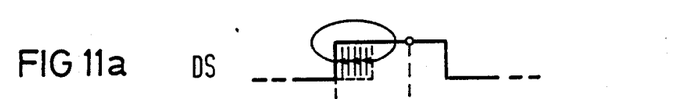
FIGS. 11a-11e illustrate pulse timing diagrams for the phase sensor according to FIG. 10.
Figure 11B:
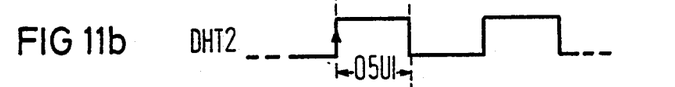
Figure 11C:
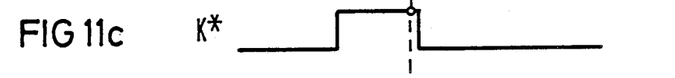
Figure 11D:
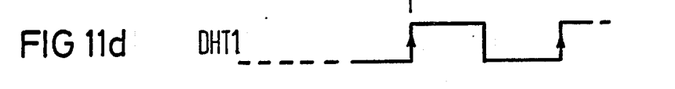
Figure 11E:
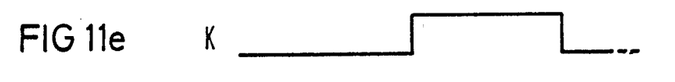

FIG. 11a shows how the front edge of the pulses of the digital signal DS at the D input of the D-type flipflop 34 shifts from clock period to clock period until the instantaneous phase relationship shown by a continuous line is reached. This corresponds to the phase relationship of the active edge, indicated by an arrow in FIG. 11b of the auxiliary data clock DHT2 at the clock input. During the auxiliary data clock DHT2, the pulse of digital signal DS at the Q output is forwarded as correction signal K* shown in FIG. 11c which is still asynchronous with respect to the auxiliary data clock DHT1. According to the invention, the phase relationship of the active edge, also marked by an arrow in FIG. 11d of the auxiliary data clock DHT1 is shifted by 0.5 UI by comparison. This is now used to form the synchronous correction signal K shown in FIG. 11e in the correction signal generator 35. The D-type flipflop 34 is reset by means of an inhibit signal S.

Figure 12:
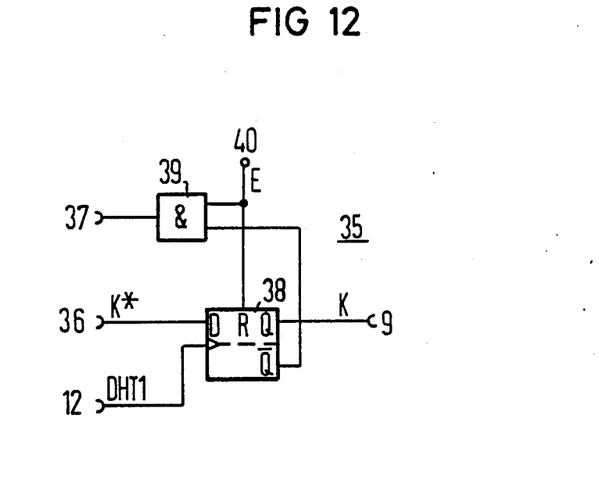
FIG. 12 shows a correction signal generator.

FIG. 12 shows the correction signal generator 35 in detail. It consists of a D-type flipflop 38 and an AND gate 39 connected as shown. FIGS. 13a–13g illustrate the pulse timing diagrams associated with FIGS. 10 and 12.

Figures 13A, 13G:
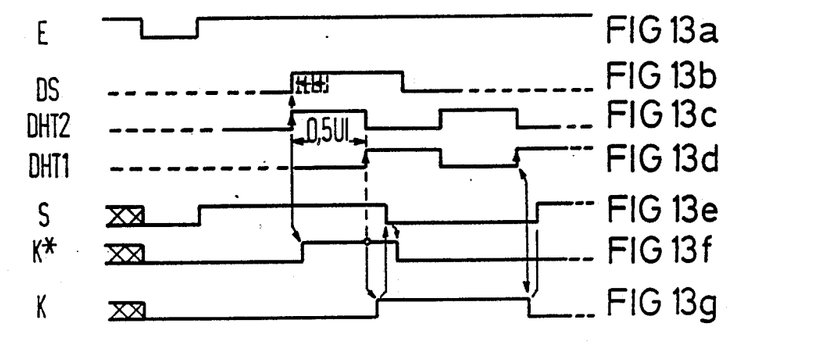

A setting signal E shown in FIG. 13a at the input 40 brings the D-type flipflop 38 into a logical "L" state at the Q output. The Q output of D-type flipflop 34 is also provided with the same state with the AND gate 39. If the phase interval between digital signal DS shown in FIG. 13b and the auxiliary data clock DHT2 shown in FIG. 13c becomes the interval zero, a logical "H" state is entered from the D input to the Q output in the D-type flipflop 34. This indicates the beginning of the asynchronous correction signal K* shown in FIG. 13f. A logical "H" state is entered from the D input to the Q output in the D-type flipflop 38 by the auxiliary data clock DHT1, delayed by 0.5 UI, and the synchronous correction signal K begins as shown in FIG. 13g. At the same time, the $\overline{Q}$ output of the D-type flipflop 38 attains a logical "L", state which causes a logical "L" state at the reset input of the D-type flipflop 34. This is reset and its Q output goes to a logical "L". This indicates the end of the pulse of the asynchronous correction signal K*. The D-type flipflop 34 remains reset for the duration of the pulse of the correction signal K. One period of the auxiliary data clock DHT1 later, a logical "L" state is supplied by the auxiliary data clock DHT1 into the D input of the D-type flipflop 38. The state at its Q output goes to a logical "L" and the state at the reset input of the D-type flipflop 34 goes back to a logical "H". This can now be activated again from the D input.

Although the invention has been described with respect to preferred embodiments, it is not to be so limited as changes and modifications may be made therein which are within the scope of the invention as described by the appended claims.

I claim as my invention:

1. A method for generating a correction signal K when a defined phase interval occurs between a digital signal DS and a first auxiliary data clock signal DHT1 which is the recovered clock of the digital signal DS, which has been selected and, which has a phase relationship which changes relative to one of several auxiliary clocks HT1–HTm which are shifted equal phase angles relative to each other where m is an integral number, comprising, the steps of generating a second auxiliary data clock DHT2 which has the same frequency as said first auxiliary data clock signal and which is shifted in phase by a fraction n/m from the first auxiliary data clock DHT1, measuring the phase angle between the first edges of the pulses of said digital signal DS and said second auxiliary data clock DHT2 where n=integral number, n≦m and producing the correction signal K as an output if no phase angle is detected and shifting from one clock signal to the other in response to the correction signal K.

2. A method according to claim 1, wherein one of the auxiliary clocks Htl–Htm is selected and used as the second auxiliary data clock DHT2 with a switch 14.

3. A method according to claim 2, wherein an even number m of auxiliary clocks HT1–HTm are used and an auxiliary clock HT1–HTm, which is shifted in phase by 0.5 UI with respect to the first auxiliary data clock DHT1, is selected as the second auxiliary data clock DHT2 where UI is a unit interval.

4. Apparatus for generating a correction signal K when a defined phase angle occurs between a digital signal DS and a first auxiliary data clock signal DHT1 which indicates a selection which changes with the phase angle of one of several data clocks HT1–HTm which are shifted equal phase angles relative to each other comprising, a first D-type flipflop (34), the D input of said first D-type flipflop is the input (7) which receives the digital signal DS and a clock input is the input (11) for a second auxiliary data clock DHT2, a device (35) for generating the correction signal K synchronously with the first auxiliary data clock DHT1 which has a first input which is connected to the Q output of said first D-type flipflop and an inhibit signal output of said device (35) is connected to the reset input of said first D-type flipflop (34) and the second input of said device (35) is the input (12) for the first auxiliary data clock (DHT1) and the output (9) of said device 35 is a correction signal K and the auxiliary data clock DHT1 is a recovered clock of the digital signal DS and means receiving said correction signal K and shifting from the first auxiliary to the auxiliary clock signal.

5. Apparatus according to claim 4, in which said device (35) for generating the correction signal K consists of a second D-type flipflop (38) which has its D input connected to the Q output of said first D-type flipflop (34) and its clock input is connected to the input (12) for the first auxiliary data clock DHT1 and its Q output is the correction signal K, and a first AND gate (39) which has a first input connected to the $\overline{Q}$ output of said second Dtype flipflop (38), and a second input connected to the reset input of said second D-type flipflop (38) and to an input (40) which receives setting a signal E and the output (37) of said first AND gate (39)

connected to the reset input of said first Dtype flipflop (34).

6. Apparatus according to claims 4 or 5, comprising a first change-over switch (13) for selecting one of the auxiliary clocks HT1 as a first auxiliary data clock DHT1 wherein a second change-over switch (14) is coupled to the auxiliary data clock DHT2 and the auxiliary clock (HT3) has a desired phase interval relative to the first auxiliary data clock DHT1.

7. Apparatus according to claim 6 wherein said changeover switches (13, 14) are electrical switches.

8. Apparatus according to claim 4, comprising a change-over switch (13, 14) and for each auxiliary clock HT1-HT4, a D-type flipflop (25-28) with a test input T1 and a test enable input TE, the clock input is connected through an inverter (21-24) to the input (3a-3d) for the auxiliary clock HT1-HT4, the Q output is connected to the D input, the TE input is connected to the synchronous correction signal K and the TI input is connected to a control device (15), a further AND gate (29-32) provided for each auxiliary clock HT1-HT4 which have the first inputs connected to the Q output of the D-type flipflop (25-28) with the test input and the test enable input and the second inputs connected to the input (3a-3d) for the auxiliary clock HT1-HT4, and an OR gate (33) which with its inputs connected to the outputs of one of the further AND gates (29-32) and which produces an output (4, 11) which is the auxiliary data clock DHT1, DHT2.

9. Apparatus according to claim 4 or 5 wherein said apparatus is formed as integrated circuits.

10. Apparatus according to claim 4 or 5 wherein a bit rate of equal to or greater than 34 Mbit/s is used for the clock input.

* * * * *